(12) United States Patent
Won et al.

(10) Patent No.: US 9,828,898 B2
(45) Date of Patent: Nov. 28, 2017

(54) OPTIMIZED STRUCTURE FOR INTEGRATED CATALYTIC MUFFLER

(71) Applicant: Hyundai Motor Company, Seoul (KR)

(72) Inventors: Jong-Seung Won, Gyeonggi-do (KR); Hyun-Wook Kim, Gyeonggi-do (KR); Ja-Kyung Ku, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/062,427

(22) Filed: Mar. 7, 2016

(65) Prior Publication Data

US 2017/0122171 A1 May 4, 2017

(30) Foreign Application Priority Data

Oct. 29, 2015 (KR) .......................... 10-2015-0150840

(51) Int. Cl.
| | |
|---|---|
| F01N 3/10 | (2006.01) |
| F01N 3/20 | (2006.01) |
| F01N 13/18 | (2010.01) |
| F01N 1/08 | (2006.01) |

(52) U.S. Cl.
CPC ........... *F01N 3/2066* (2013.01); *F01N 1/083* (2013.01); *F01N 13/1805* (2013.01); *F01N 2230/04* (2013.01)

(58) Field of Classification Search
USPC ......... 60/282, 299, 300, 301, 302, 322, 324; 181/210, 222, 231, 249, 252, 255, 256
See application file for complete search history.

(56) References Cited

U.S. PATENT DOCUMENTS

| | | | |
|---|---|---|---|
| 7,866,442 B2* | 1/2011 | Shimomura | F01N 1/08 181/249 |
| 8,388,896 B2* | 3/2013 | Lehnen | F01N 1/084 422/168 |
| 9,289,723 B2* | 3/2016 | Kobayashi | B01D 53/94 |
| 2005/0115229 A1* | 6/2005 | Worner | F01N 1/04 60/299 |
| 2006/0266022 A1* | 11/2006 | Woerner | F01N 1/08 60/295 |
| 2014/0360170 A1* | 12/2014 | Hacklander | F01N 3/2066 60/286 |

FOREIGN PATENT DOCUMENTS

| | | |
|---|---|---|
| EP | 1703097 A1 | 9/2006 |
| JP | 8-246861 A | 9/1996 |
| JP | 10-159550 A | 6/1998 |
| JP | 2001-295641 A | 10/2001 |
| KR | 10-2003-0021130 A | 3/2003 |
| KR | 10-2009-0128700 A | 12/2009 |
| KR | 10-2010-0023342 A | 3/2010 |

* cited by examiner

*Primary Examiner* — Binh Q Tran
(74) *Attorney, Agent, or Firm* — Mintz Levin Cohn Ferris Glovsky and Popeo, P.C.; Peter F. Corless

(57) ABSTRACT

An optimized structure for an integrated catalytic muffler is provided to purify exhaust gas from an engine and reduce noise when the exhaust gas flows to the rear of a vehicle. The structure includes a case having an inlet and an outlet, and an SCR catalytic unit that is mounted to the case. Particularly, a portion of the SCR catalytic unit is inserted into the case and the remaining portion is exposed out of the case. The SCR catalytic unit is coupled to the case by bolting or clamping. Accordingly, the production cost and weight are reduced, and maintenance and repair are facilitated.

8 Claims, 3 Drawing Sheets

OPTIMIZED STRUCTURE FOR INTEGRATED CATALYTIC MUFFLER

CROSS-REFERENCE TO RELATED APPLICATION

This application claims the priority benefit of Korean Patent Application No. 10-2015-0150840, filed on Oct. 29, 2015 in the Korean Intellectual Property Office, the disclosure of which is incorporated herein by reference.

BACKGROUND

1. Field of the Invention

The present invention relates to a muffler (e.g., a silencer) mounted to a vehicle, and more particularly to an optimized structure for an integrated catalytic muffler, in which a selective catalytic reduction (SCR) catalytic unit is integrally coupled to a muffler by bolting or clamping to insert a portion of the SCR catalytic unit into the muffler and expose the remaining portion out of the muffler, thereby substantially reducing the production cost and weight and facilitating maintenance and repair.

2. Description of the Related Art

In general, an exhaust system is mounted on the underbody of a vehicle to reduce noise and remove impurities from exhaust gas generated from an engine before the exhaust gas is emitted to the atmosphere. An exhaust system typically includes an exhaust manifold connected with a cylinder head of an engine, one or more mufflers configured to reduce noise by applying resistance to the flow of the exhaust gas from the engine, and a catalytic converter (a catalytic unit) configured to convert toxic substances, such as hydrocarbons, carbon monoxide, nitrogen oxides, etc., included in the exhaust gas into carbon dioxide, water, nitrogen, oxygen, etc., which are harmless to humans, through oxidation-reduction reactions.

The exhaust manifold, the muffler, and the catalytic converter communicate with each other via exhaust pipes, and a tail pipe, which communicates with the exterior, is coupled to the distal end of the muffler. The muffler is configured to reduce noise generated from exhaust gas by decreasing the temperature and the pressure of the exhaust gas. Recently, a muffler having a built-in catalytic converter (i.e. a muffler in which a catalytic converter is embedded) is being widely used to efficiently utilize the space for mounting the exhaust system and simplify the layout thereof. The muffler having the built-in catalytic converter has advantages of improved durability due to the decreased risk of damage to the catalytic converter and improved purifying performance due to the decrease in the amount of time required for catalyst activation.

However, since the aforementioned muffler having the built-in catalytic converter is manufactured and mounted to a vehicle by welding, the thickness of the components is increased. Further, since the muffler must be made of high-quality materials to be able to guarantee the muffler for as long as the catalytic unit, the weight and production cost are increased excessively. Therefore, there is a high demand for an integrated catalytic muffler structure, in which a catalytic converter is integrally coupled to a muffler to minimize the weight (e.g., thickness) and increase in production cost, thereby making it possible to more efficiently produce vehicles.

SUMMARY

Therefore, the present invention provides an optimized structure for an integrated catalytic muffler, in which an SCR catalytic unit may be integrally coupled to a muffler by bolting or clamping to allow a portion of the SCR catalytic unit to be inserted into the muffler and the remaining portion to be exposed out of the muffler, thereby reducing the production cost and weight. However, an object to be accomplished by the invention is not limited to the above-mentioned object, and other objects not mentioned will be clearly understood by those skilled in the art from the following description.

In accordance with an aspect of the present invention, the above and other objects may be accomplished by the provision of an optimized structure for an integrated catalytic muffler configured to purify exhaust gas from an engine and reduce noise when the exhaust gas flows to a rear of a vehicle, the optimized structure may include a case having an inlet and an outlet, and an SCR catalytic unit mounted to the case to allow a portion of the SCR catalytic unit to be inserted into the case and a remaining portion to be exposed out of the case.

The SCR catalytic unit may be coupled to the case by bolting or clamping. The optimized structure for an integrated catalytic muffler may further include one or more baffles mounted in the case. The baffles may include one or more apertures formed therein. The optimized structure for an integrated catalytic muffler may further include a supporting unit disposed in the case to support the SCR catalytic unit. The supporting unit may be a baffle. The baffle may include an opening formed therein to support the SCR catalytic unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
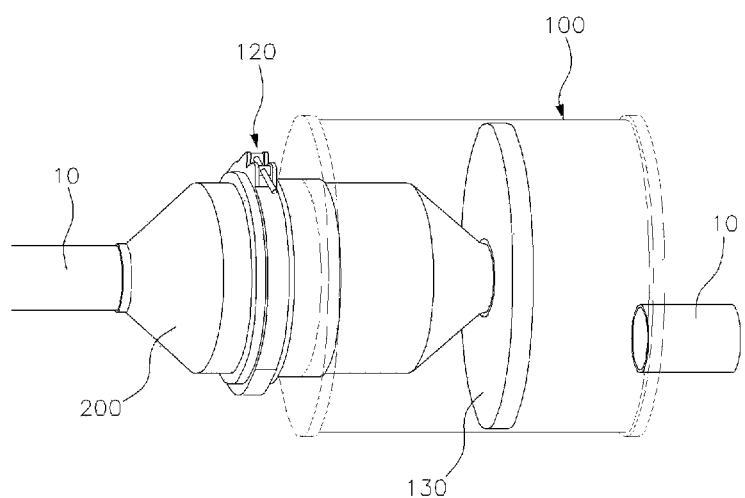
FIG. 1 is a perspective view of an optimized structure for an integrated catalytic muffler having a clamping coupling structure according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Before explaining exemplary embodiments of the present invention, it is to be understood that the phraseology and terminology used in the following specification and appended claims should not be construed as limited to general and dictionary meanings but be construed as the meanings and concepts according to the spirit of the present invention on the basis of the principle that the inventor is permitted to define appropriate terms for the best explanation. The exemplary embodiments described in the following specification and shown in the accompanying drawings are illustrative only and are not intended to represent all aspects of the invention, so that it is to be understood that various equivalents and modifications can be made without departing from the spirit of the invention.

The terminology used in the description of the invention herein is for the purpose of describing particular embodiments only and is not intended to be limiting of the invention. As used in the description of the invention and the appended claims, the singular forms "a", "an" and "the " are intended to include the plural forms as well, unless the context clearly indicates otherwise.

Figure 2A:
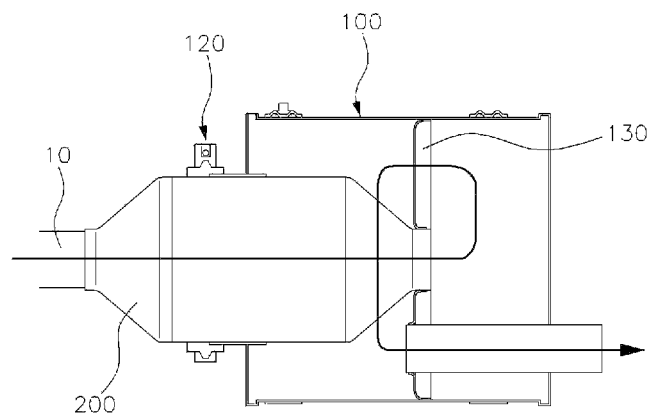
FIGS. 2A-2B are sectional views of an optimized structure for an integrated catalytic muffler having a clamping coupling structure according to an exemplary embodiment of the present invention.
Figure 2B:
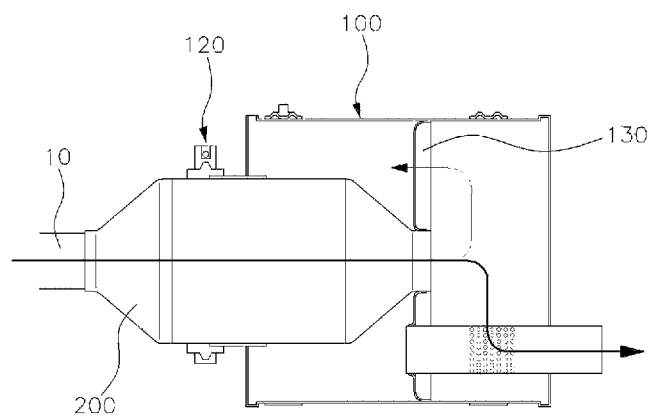

Moreover, to reduce the weight and production cost of a vehicle and facilitate the maintenance and repair of a muffler and/or a catalytic unit, the present invention provides an optimized structure for an integrated catalytic muffler, which may include a case 100 having an inlet and an outlet, and a selective catalytic reduction (SCR) catalytic unit 200 mounted to the case in which a portion (e.g., a first portion) of the SCR catalytic unit may be inserted into the case and the remaining portion (e.g., a second portion) may be exposed out of the case. For better understanding of the present invention, FIG. 1 shows a perspective view of an optimized structure for an integrated catalytic muffler having a clamping coupling structure according to an exemplary embodiment of the present invention, and FIGS. 2A-2B show sectional views of an optimized structure for an integrated catalytic muffler having a clamping coupling structure according to an exemplary embodiment of the present invention.

The term "muffler", as used in the present invention, refers to a device configured to reduce noise generated from an internal combustion engine, a ventilation apparatus, etc. Typically, a muffler is made of a metal material and has a cylindrical shape or a rectangular box shape. As the noise-reducing performance of a muffler is enhanced, resistance to the flow of exhaust gas may also be increased, which results in a decrease in engine output. Therefore, it is important to balance the noise-reducing effect and the engine output when manufacturing a muffler. Though various types of mufflers are known in the art, a typical muffler has a structure such that a cylindrical body is formed using a steel sheet having a thickness of about 1mm and the interior of the cylindrical body may be divided into several spaces, which interfere with sound waves, decrease fluctuations in pressure, and decrease the temperature of exhaust gas while the exhaust gas flows through the muffler, thereby gradually reducing noise.

The term "catalytic unit", as used in the present invention, refers to a device configured to convert toxic substances included in the exhaust gas into substances that are harmless (e.g., oxygen, nitrogen, carbon dioxide, water, etc.) to humans. Recently, an SCR catalytic unit 200 is required to be installed according to new and more stringent regulations, but it may be difficult to apply the SCR catalytic unit to vehicles having current specifications due to interference between the catalytic unit and the muffler.

The SCR catalytic unit 200 is a catalytic unit having a selective reduction catalyst, configured to convert nitrogen oxide (e.g., a toxic substance causing problems such as acid rain, photochemical smog, etc.), generated by the use of fossil fuels, into harmless substances such as nitrogen, oxygen, etc. before the nitrogen oxide is emitted to the atmosphere. An optimized structure for an integrated catalytic muffler according to the present invention may include a case 100 having an inlet and an outlet, and an SCR catalytic unit 200 mounted to the case 100 in which a portion of the SCR catalytic unit 200 may be inserted into the case 100 and the remaining portion may be exposed out of the case 100.

Referring to the drawings, exhaust gas may be introduced into the SCR catalytic unit 200 through an exhaust pipe 10 connected to the exposed portion of the SCR catalytic unit 200, may be discharged to the case 100 from the inserted portion of the SCR catalytic unit 200, and may be discharged out of the case 100 through the exhaust pipe 10. The SCR catalytic unit 200 may be coupled to the case 100 by bolting 110 or clamping 120. Not only does this bolting or clamping coupling structure reduce a thickness in comparison with a welding coupling structure, but also allows for easier separation of the SCR catalytic unit 200 from the case 100 when maintenance and repair are required.

Figure 3A:
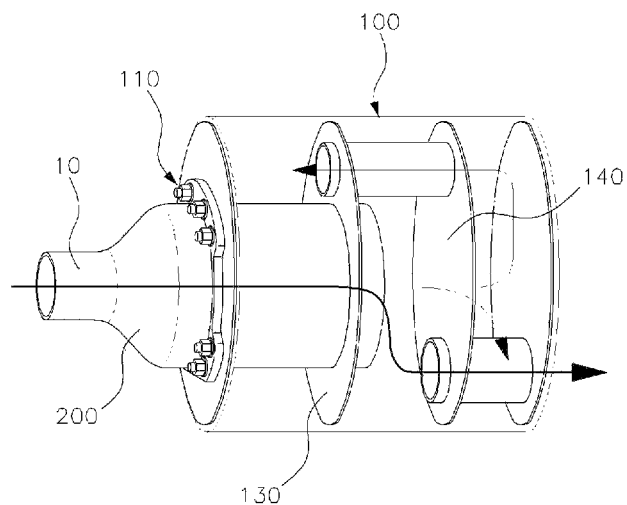
FIGS. 3A-3B are perspective views of an optimized structure for an integrated catalytic muffler having a bolting coupling structure according to an exemplary embodiment of the present invention.
Figure 3B:
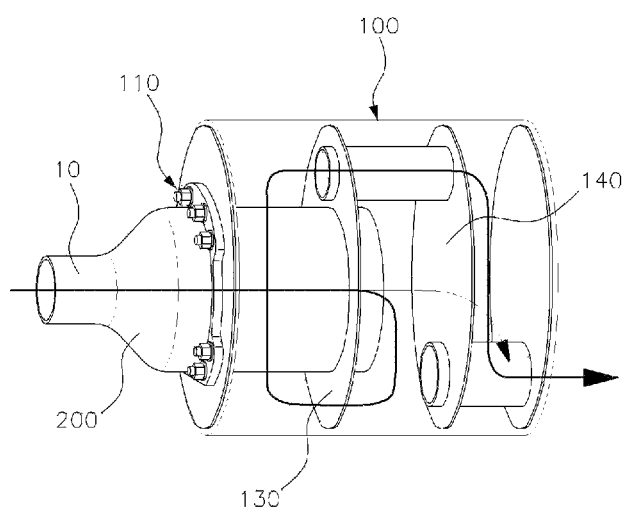

As shown in FIGS. 1, 2A, and 2B that the SCR catalytic unit 200 may be coupled to the case 100 by clamping 120, and FIGS. 3A and 3B show that the SCR catalytic unit 200 may be coupled to the case 100 by bolting 110. Additionally, a plurality of baffles 140 may be mounted in the case 100 to more efficiently reduce noise. The number of baffles 140 may be variously changed as needed. A plurality of apertures for the flow of exhaust gas may be formed in the baffles.

The optimized structure for an integrated catalytic muffler according to the present invention may further include a supporting unit 130 mounted within the case 100 to support the SCR catalytic unit 200. Although the SCR catalytic unit 200 may be coupled to the case 100 by clamping 120 or bolting 110, to further increase structural stability, the supporting unit 130 may be provided to support an end portion of the SCR catalytic unit 200 within the case 100. The supporting unit 130 may be provided as a separate supporting structure within the case 100, however, the baffle 140 may be formed to be used as the supporting unit 130 to support the SCR catalytic unit 200. Therefore, the baffle 140 may have an opening formed therein to support the SCR catalytic unit 200.

FIGS. 3A and 3B show perspective views of an optimized structure for an integrated catalytic muffler having a bolting coupling structure according to an exemplary embodiment of the present invention. As shown, the SCR catalytic unit 200 may be coupled to the case 100 by bolting 110 instead of the aforementioned clamping 120. In this exemplary embodiment, two baffles 140 may be disposed within the case 100. One of the baffles (e.g., a first baffle), which is disposed near (e.g., proximate to) the front end of the case, may operate as both a baffle and the supporting unit 130 as described above, and the other one (e.g., a second baffle), which is disposed near (e.g., proximate to) the rear end of the case, may operate as a typical baffle. Therefore, the baffle 140 disposed near the front end of the case may include an opening formed therein to support the SCR catalytic unit 200.

The arrows depicted in FIGS. 2A, 2B, 3A, and 3B indicate the flow of exhaust gas. FIG. 2A shows that exhaust gas may flow into the case 100 through the SCR catalytic unit 200, pass through the baffle 140 that also operates as the supporting unit 130, and flow into the exhaust pipe 10. FIG. 2B shows that a portion of the exhaust gas may flow similarly to the exhaust gas in FIG. 2A, and the remaining portion of the exhaust gas may flow directly into the exhaust pipe without passing through the baffle. FIGS. 3A and 3B show that various flows of exhaust gas may be achieved in the same arrangement of the baffles 140.

As is apparent from the above description, the present invention provides an optimized structure for an integrated catalytic muffler, in which the SCR catalytic unit may be integrally coupled to the muffler by bolting or clamping to allow a portion of the SCR catalytic unit to be inserted into the muffler and the remaining portion to be exposed out of the muffler, thereby substantially reducing the weight and production cost in comparison with a conventional integrated catalytic muffler. Further, the above-described constitution of the integrated catalytic muffler makes it possible to facilitate the maintenance and repair of the muffler and/or the catalytic unit when the integrated catalytic muffler malfunctions while traveling.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optimized structure for an integrated catalytic muffler for purifying exhaust gas from an engine and reducing noise when the exhaust gas flows to a rear of a vehicle, the optimized structure comprising:
    a case having an inlet and an outlet; and
    a selective catalytic reduction (SCR) catalytic unit mounted to the case, wherein a portion of the SCR catalytic unit is inserted into the case and a remaining portion is exposed out of the case,
    wherein the SCR catalytic unit is coupled to the case by bolting or clamping.

2. The optimized structure for an integrated catalytic muffler according to claim 1, further comprising:
    a plurality of baffles mounted within the case.

3. The optimized structure for an integrated catalytic muffler according to claim 2, wherein the baffles include a plurality of apertures formed therein.

4. The optimized structure for an integrated catalytic muffler according to claim 1, further comprising:
    a supporting unit provided in the case to support the SCR catalytic unit.

5. The optimized structure for an integrated catalytic muffler according to claim 4, wherein the supporting unit is a baffle.

6. The optimized structure for an integrated catalytic muffler according to claim 5, wherein the baffle has an opening formed therein to support the SCR catalytic unit.

7. The optimized structure for an integrated catalytic muffler according to claim 2, wherein a first baffle is disposed proximate to a first end of the case and operates as both a baffle and a supporting unit and a second baffle is disposed proximate to a rear end of the case and operates as a baffle.

8. The optimized structure for an integrated catalytic muffler according to claim 7, wherein the first baffle includes an opening formed therein to support the SCR catalytic unit.

* * * * *